United States Patent
Van Assche et al.

(10) Patent No.: US 9,886,362 B2
(45) Date of Patent: Feb. 6, 2018

(54) CHECKING THE INTEGRITY OF A PROGRAM EXECUTED BY AN ELECTRONIC CIRCUIT

(75) Inventors: Gilles Van Assche, Woluwe-Saint-Lambert (BE); Ronny Vankeer, Hoeilaart (BE)

(73) Assignee: PROTON WORLD INTERNATIONAL N.V., Diegem (BE)

(*) Notice: Subject to any disclaimer, the term of this patent is extended or adjusted under 35 U.S.C. 154(b) by 838 days.

(21) Appl. No.: 13/524,456

(22) Filed: Jun. 15, 2012

(65) Prior Publication Data
US 2013/0007420 A1     Jan. 3, 2013

(30) Foreign Application Priority Data

Jun. 30, 2011 (FR) ...................................... 11 55874

(51) Int. Cl.
*G06F 11/28* (2006.01)
*G06F 21/52* (2013.01)

(52) U.S. Cl.
CPC .............. *G06F 11/28* (2013.01); *G06F 21/52* (2013.01)

(58) Field of Classification Search
CPC ............................. G06F 11/28; G06F 11/3466
USPC .................................................. 712/217, 227
See application file for complete search history.

(56) References Cited

U.S. PATENT DOCUMENTS

| | | | |
|---|---|---|---|
| 5,974,529 A * | 10/1999 | Zumkehr | G06F 9/3005 712/239 |
| 6,173,395 B1 * | 1/2001 | Wisor et al. | 712/236 |
| 6,175,914 B1 * | 1/2001 | Mann | 712/227 |
| 6,594,782 B1 * | 7/2003 | Tagawa | G06F 11/364 712/227 |
| 6,658,557 B1 * | 12/2003 | McCoy et al. | 712/227 |
| 6,694,427 B1 * | 2/2004 | Mericas et al. | 712/227 |
| 7,168,065 B1 | 1/2007 | Naccache et al. | |
| 7,512,772 B2 * | 3/2009 | Gschwind et al. | 712/227 |
| 7,822,953 B2 * | 10/2010 | Modave | G06F 21/52 712/220 |
| 2004/0255124 A1 * | 12/2004 | Courcambeck | G06F 12/1475 713/176 |
| 2006/0156005 A1 * | 7/2006 | Fischer | G06F 21/52 713/176 |
| 2007/0033467 A1 * | 2/2007 | Bancel | G06F 21/79 714/732 |

(Continued)

FOREIGN PATENT DOCUMENTS

WO     WO 2007/07714 A2     7/2007

OTHER PUBLICATIONS

French Search Report and Written Opinion dated Nov. 8, 2011 from corresponding French Application No. 11/55874.

(Continued)

*Primary Examiner* — Andrew Caldwell
*Assistant Examiner* — Michael Metzger
(74) *Attorney, Agent, or Firm* — Seed IP Law Group LLP

(57) ABSTRACT

A method for checking the integrity of a program executed by an electronic circuit and including at least one conditional jump, wherein: a first value is updated for any instruction which does not correspond to a jump instruction; a second value is updated with the first value for each conditional jump instruction; and the second value is compared with a third value, calculated according to the performed conditional jumps.

24 Claims, 2 Drawing Sheets

(56) References Cited

U.S. PATENT DOCUMENTS

2008/0256301 A1* 10/2008 Liardet et al. ............... 711/125

OTHER PUBLICATIONS

Nahmsuk Oh et al: "*Control-Flow Checking by Software Signatures*", IEEE Transactions on Reliability, IEEE Service Center, Piscataway, NJ, US, vol. 51, No. 1, Mar. 1, 2002 , XP011079413.

* cited by examiner

US 9,886,362 B2

CHECKING THE INTEGRITY OF A PROGRAM EXECUTED BY AN ELECTRONIC CIRCUIT

CROSS REFERENCE TO RELATED APPLICATIONS

This application claims the priority benefit of French patent application number 11/55874, filed on Jun. 30, 2011, entitled CHECKING OF THE INTEGRITY OF A PROGRAM EXECUTED BY AN ELECTRONIC CIRCUIT, which is hereby incorporated by reference to the maximum extent allowable by law.

BACKGROUND OF THE INVENTION

Technical Field

Embodiments generally relate to electronic circuits and, more specifically, to a checking of the integrity of programs executed by a microprocessor.

Discussion of the Related Art

Electronic circuits, and more specifically microprocessors executing programs, are capable of undergoing disturbances (introduction of viruses or fault injection attack). They are then often equipped with integrity checking mechanisms.

A particularly common technique comprises checking whether the executed instructions correspond to the expected instructions. A signature of the program instructions is calculated on design of the program or on recording thereof in a generally non-volatile memory associated with the processing unit. Then, during the execution of the program, a current signature is calculated and compared with the pre-recorded reference signature.

Such techniques work well with programs having a set development, but raise issues as soon as the program comprises conditional jumps or variable numbers of iterations of the same calculation. Indeed, it is then particularly complicated to calculate the signature without knowing at the design stage what jumps or how many iterations will be performed.

A solution is not to take into account, in the signature calculation, possible sections (instruction, groups of instructions, sub-programs, etc.) linked to conditional jumps or to the iterations. However, the integrity of such sections is then not checked. In cryptographic applications where calculations are often performed by successive iterations and/or where the type of operation often depends on the state of a bit linked to the current iteration, this makes calculations vulnerable to possible fault-injection attacks.

SUMMARY

An embodiment provides a mechanism for checking the integrity of a program which overcomes all or part of the disadvantages of usual solutions.

An embodiment provides an integrity check mechanism compatible with the checking of instructions in conditional jumps and in iterations.

An embodiment provides a method for checking the integrity of a program executed by an electronic circuit and comprising at least one conditional jump, wherein:

a first value is updated for any instruction which does not correspond to a jump instruction;

a second value is updated with the first value for each conditional jump instruction; and the second value is compared with a third value, calculated according to the performed conditional jumps.

According to an embodiment, the third value is calculated during the execution of the program from pre-calculated reference values, at least one reference value being assigned to a section called by a conditional jump.

According to an embodiment, for each new executed instruction, it is determined whether the instruction is a conditional jump instruction, to update the first value or increment the second value according to cases.

According to an embodiment, none of the first and second values is modified in case of an unconditional jump instruction.

According to an embodiment, the updating of the first value is performed by a function cumulating the values of the instruction bits.

According to an embodiment, the updating of the first value is performed by a CRC calculation function.

According to an embodiment, the first value is reset after each increment of the second value.

According to an embodiment, the third value is calculated during the development of the program.

According to an embodiment, the third value is calculated at the end of the program execution, at least one counter of the number of conditional jumps being updated during the program execution.

Another embodiment provides an electronic circuit comprising a circuit for implementing the integrity check method.

The foregoing and other objects, features, and advantages will be discussed in detail in the following non-limiting description of specific embodiments in connection with the accompanying drawings.

DETAILED DESCRIPTION

Figure 1:
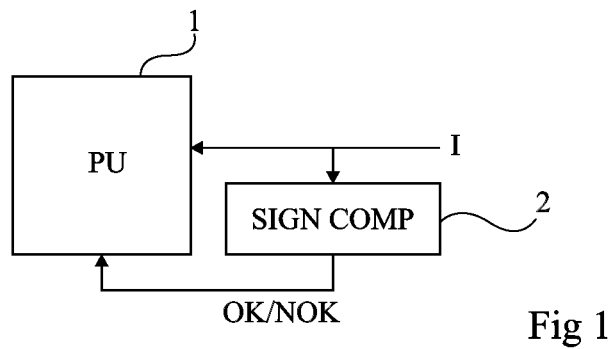
FIG. 1 is a partial block diagram of an example of an electronic system of the type to which the described embodiments apply.

The same elements have been designated with the same reference numerals in the different drawings.

For clarity, only those elements which are useful to the understanding of the described embodiments have been shown and will be detailed. In particular, the functions implemented by the checked programs have not been detailed, embodiments being compatible with usual programs. Further, the use that is made of the result of the integrity check mechanism has not been detailed either, the embodiments being here again compatible with usual uses of integrity check results.

FIG. 1 is a partial block diagram of an electronic circuit equipped with an embodiment of an integrity check mechanism.

This circuit comprises a processing unit 1 (PU) in charge of executing instructions I of a program. In applications more specifically targeted by the described embodiments, these instructions originate from a non-volatile memory and are capable of undergoing modifications (intentional or incidental) between their extraction from the memory and the execution by the central processing unit. These instructions may also originate from a non-volatile memory through which they transit, from another circuit than that integrating unit 1, etc., the described embodiments checking the integrity by intercepting the instructions at the time of their loading for execution in the processing unit.

To verify that these instructions have not been modified, the circuit of FIG. 1 comprises a circuit 2, preferably dedicated, for checking the integrity of the executed instructions (SIGN COMP). This mechanism is a checking of a signature of the instructions. A calculation is performed based on the instructions loaded into the processing unit and the result of this calculation is compared with a value calculated on loading of the program into the non-volatile memory.

Circuit 2 provides a result (OK/NOK), for example to the processing unit, which takes the appropriate measures according to this result. Most often, the signature checking is performed at the end of the program or at given steps thereof, and enables to interrupt the execution or to validate/invalidate the provided result.

Figure 2:
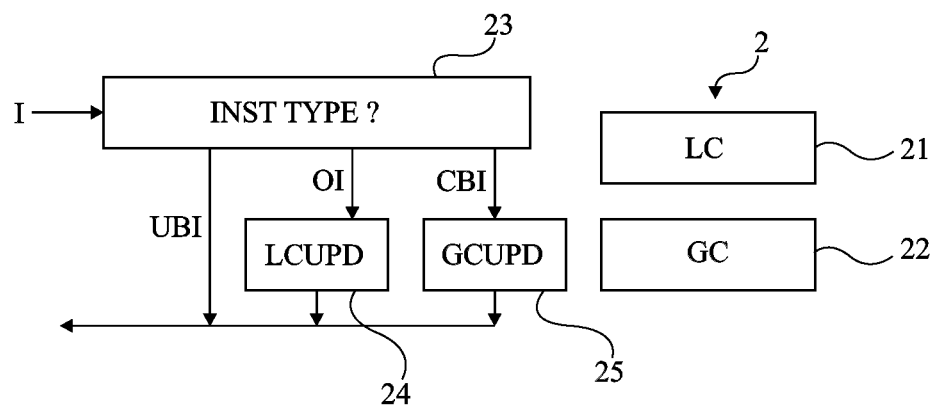
FIG. 2 is a block diagram illustrating a detail of the circuit of FIG. 1.

FIG. 2 is a more detailed representation, in the form of blocks, of an embodiment of circuit 2. This circuit comprises two storage elements 21 (LC) and 22 (GC) intended to contain first and second current values or signatures. Such storage elements are, for example, registers formed with volatile memory elements. Circuit 2 also comprises an element 23 (INST TYPE?) for detecting the type of received instruction I (being executed by the processing unit). The distinguished instruction types are conditional jump instructions (CBI), unconditional jump instructions (UBI), and other instructions (OI). A loop calculation (iterations) corresponds to a conditional jump if the number of iterations is not fixed.

According to the instruction type, circuit 2 updates one or the other or none of current values LC or GC. For any instruction which does not correspond to a conditional jump instruction, current signature LC is updated. For any instruction corresponding to a conditional jump, current signature GC is updated. Possibly, in the presence of an instruction corresponding to an unconditional jump, none of the current signatures is updated. Once the possible update of a current signature has been performed, it is proceeded to the next instruction. In one embodiment with a dedicated circuit 2, said circuit comprises two cells 24 (LC UPD) and 25 (GC UPD) for updating values LC and GC.

Figure 3:
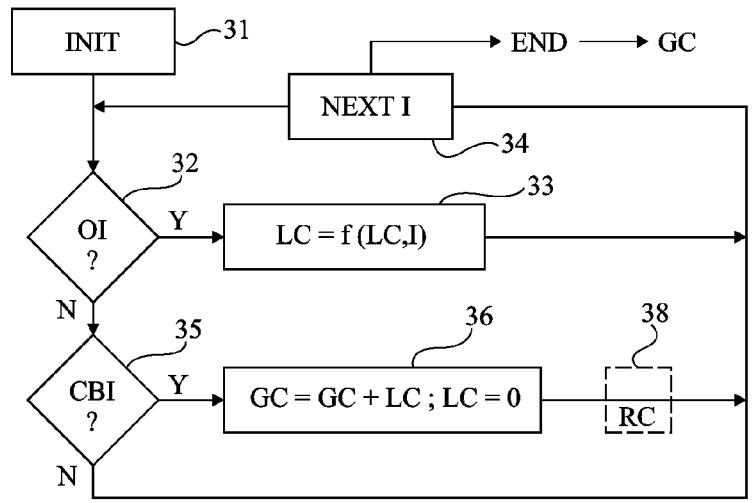
FIG. 3 illustrates, in the form of blocks, an embodiment of the integrity check mechanism.

FIG. 3 is a simplified flowchart of an embodiment of the mechanism of integrity checking by means of circuit 2.

A first step (block 31, INT) comprises initializing current signatures LC and GC which are, for example, set to a zero value.

Then, the first instruction is loaded and it is determined (block 32, OI?) whether this instruction is an instruction other than a jump instruction. If it is (output Y of block 32), signature LC is updated (block 33, LC=f(LC, I)) by application of a function f to the previous value contained in storage element 21 and to the value of instruction I. Function f for example is a function cumulating the bits of the instruction to the previous total (CHECKSUM). According to another example providing a better diffusion of the signature, function f is a CRC-type (Cyclic Redundancy Check) function.

Once value LC has been updated, it is proceeded to the next instruction (block 34, NEXT I).

If the instruction is a jump instruction (output N of block 32), it is determined (block 35, CBI?) whether it is a conditional jump instruction.

If it is (output Y of block 35), second value GC is updated by being added value LC and value LC is reset (block 36, GC=GC+LC; LC=0). It is proceeded to the next instruction (block 34). The operation is for example performed modulo the register cardinality (modulo $2^n$ where n stands for the number of bits of register 22). As a variation, the addition is an XOR-type operation, that is, a bit-to-bit addition.

If the jump instruction is an unconditional jump instruction (output N of block 35), it is directly proceeded to the next instruction (block 34) without updating the signatures.

The fact of not updating the signature in case of an unconditional jump (UBI) makes it easier for the programmer to implement the method. However, it may also be provided to consider an unconditional jump instruction as any other instruction and then update value LC.

When the last instruction has been processed, the current signature calculation loop is ended (END) and the value contained by storage element 22 (GC) contains the value to be checked against a reference value or signature.

To perform this checking, the reference signature should take into account the number of conditional jumps performed, as will now be described in relation with a simplified example.

Figure 4:
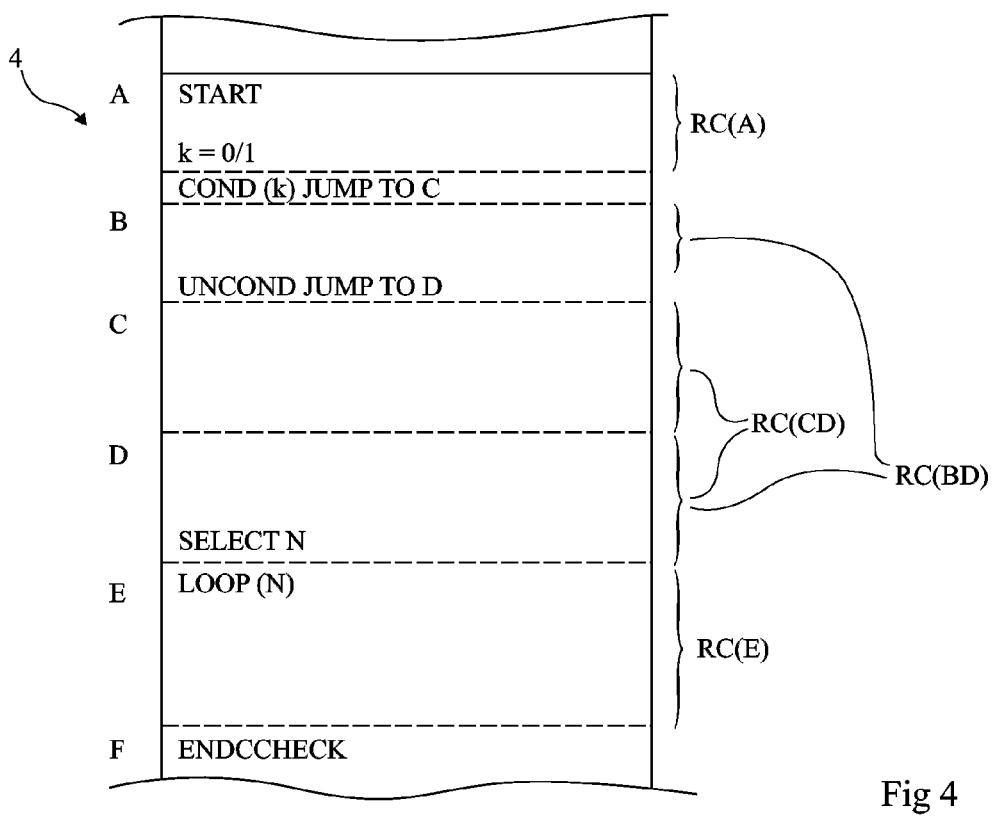
FIG. 4 is an example of application of the mechanism of FIG. 3.

FIG. 4 is a simplified example of program 4 capable of being checked by the described mechanism. Program 4 comprises several sections A, B, C, D, and E, for example, written one after the other, and starts in section A.

It is assumed that:

section A is a systematically executed unconditional section;

sections B and C are conditional sections executed according to the result of a conditional jump instruction (COND(k) JUMP TO C) on the value (for example, 0 or 1) taken by a variable k, at the end of section A (k=0/1), instruction COND JUMP for example being an instruction of the type "if . . . then . . . else" performing either a jump to section C, or a carrying on of the execution which corresponds to section B;

section D is an unconditional section executed either after section B by an unconditional jump (UNCOND JUMP TO D) or at the end of section C by carrying on the execution; and section E is a loop (LOOP(N)) of N iterations, value N being determined in section D (SELECT N). If N is 0, the loop is skipped and the program directly passes to the next instruction (in the example, the end instruction).

In the present example, four reference signatures RC(A), RC(BD), RC(CD), and RC(E) are calculated on installation or loading of the program into the non-volatile memory of the electronic circuit. Such signatures correspond to the value provided by application of function f to the instructions of the sections (for example, A and E) or groups of sections (for example, B and D, and C and D) executed unconditionally. Unconditional jump instruction UNCOND JUMP TO D may be comprised in section B.

An advantage of calculating signatures RC(BD) and RC(CD) rather than calculating three signatures RC(B), RC(C), and RC(D), and then cumulating them is that this decreases the number of signatures to be stored. Further, this improves the security by verifying in a row the execution of sections B and D, or C and D. If the program carries on unconditionally after section E, the signature of the corresponding instructions is calculated with that of section A. It can thus be seen that the reference signatures may overlap and share same sections.

The four pre-calculated values are used by the integrity check mechanism for, according to the program execution, calculating a current value GC to be compared with reference signature RC. For example, a check instruction CHECK corresponds to the last instruction.

According to an embodiment, signature RC is calculated at the same time as the current signature. It is initialized at step 31 (FIG. 3) with value RC(A). Then, according to the result of the conditional jump instruction (taking the example of a signature GC based on an increment modulo $2^n$), value RC(BD) or RC(CD) is added (block 38 in dotted lines) according to the called section C or D. Then, according to value N, a multiple of signature RC(E) is added to the previous sum.

On the current signature calculation side (block 36), it is not necessary to distinguish the sections. If the execution is correct (unaltered program), value LC contains, at the time of the next update of value GC, value RC(BD) or RC(CD) according to the section which has executed.

According to another embodiment, as many counters as there are section signatures are set to zero and are incremented by one each time the corresponding section is called. Then, at the end of the execution (END), reference signature RC is calculated by adding to value RC(A) the respective products of the signatures by the corresponding numbers of executions.

In the example of FIG. 4, this amounts to calculating the following relation:

$$RC=RC(A)+k*RC(BD)+(1-k)*RC(CD)+N*RC(E).$$

Whatever the way in which it is obtained, reference signature RC is compared with the present signature.

The number of reference signatures depends on the number of different sections capable of being called in conditional jumps. In the embodiment where the reference signature is not progressively calculated, the number of counters of the numbers of executions increases correspondingly (unless several sections have the same signature).

The signature control may occur at the end of the program or at certain steps, provided for it not to be in the middle of a section.

An advantage of the described verification mechanism is that it enables to take into account the presence of conditional jumps in a program without adversely affecting its security.

Various embodiments have been described, various alterations and modifications will occur to those skilled in the art. In particular, the selection of function f depends on the application and, for example, on the calculation cells that can easily be formed. More complex signatures may for example be used, provided for the resources of the electronic circuit and for the execution time to enable it. The size of registers 21 and 22 depends on the sizes capable of being taken by values LC and GC. Value GC is incremented modulo $2^n$, where n stands for the number of bits of register 22. Value RC is calculated on a same number of bits as value GC.

Finally, the practical implementation of embodiments is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device, comprising:
one or more memories; and
circuitry configured to:
maintain a first value and a second value stored in the one or more memories; and
verify an integrity of an executing program based on the maintained first and second values, wherein the executing program comprises a plurality of instructions and the verifying the integrity of the executing program includes:
determining for each instruction of the executing program a type of the instruction;
when it is determined an instruction is not a conditional jump instruction, selectively updating the first value stored in the one or more memories;
when it is determined the instruction is a conditional jump instruction, replacing the second value stored in the one or more memories based on a current value of the first value stored in the one or more memories;
comparing a current value of the second value stored in the one or more memories with a third value calculated according to performed conditional jump instructions of the executing program; and
verifying the integrity of the executing program based on the comparing.

2. The device of claim 1 wherein the one or more memories comprise a first register configured to store the first value and a second register configured to store the second value.

3. The device of claim 1 wherein the circuitry is configured to calculate the third value during execution of the program based on reference values, at least one of the reference values being assigned to a section of the executing program corresponding to a conditional jump.

4. The device of claim 1 wherein when it is determined the instruction is an unconditional jump instruction, the first and second values are not modified in response to the determination.

5. The device of claim 1 wherein the circuitry is configured to reset the first value after each updating of the second value.

6. The device of claim 1 wherein the circuitry is configured to:
calculate the third value at an end of execution of the program, and
update at least one counter of a number of conditional jumps during execution of the program.

7. The device of claim 1, comprising processing circuitry configured to execute the program.

8. The device of claim 2 wherein replacing the second value comprises overwriting a second value previously stored in the second register.

9. The device of claim 1 wherein the second value is a value stored in a location in the memory and replacing the second value comprises overwriting the value stored in the location in the memory.

10. The device of claim 1 wherein the third value is a function of an execution flow of the executing program.

11. The device of claim 3 wherein each section of the program corresponding to a conditional jump has a corresponding reference value.

12. A method comprising:
checking integrity of a program executing by an electronic circuit based on a first value and a second value maintained in a memory, wherein the program comprises a plurality of instructions including at least one conditional jump, and wherein checking the integrity of the program comprises:

using an electronic circuit, updating the first value for any instruction which does not correspond to a jump instruction;

replacing the second value based on the first value for each conditional jump instruction; and comparing the second value with a third value calculated according to performed conditional jumps.

13. The method of claim 12, further comprising:

calculating the third value during execution of the program using reference values, at least one of the reference values being assigned to a section of the program corresponding to a conditional jump.

14. The method of claim 12, further comprising:

determining, for each new executed instruction, whether the instruction is a conditional jump instruction, updating the first value or incrementing the second value according to whether the instruction is determined to be a conditional jump instruction.

15. The method of claim 12, wherein updating the first value comprises using a function to cumulate values of bits of instructions of the program.

16. The method of claim 12, wherein updating the first value comprises performing a CRC calculation function.

17. The method of claim 12, further comprising resetting the first value after each replacing of the second value.

18. The method of claim 12, further comprising calculating the third value during development of the program.

19. The method of claim 12, further comprising:

calculating the third value at the end of execution of the program, and updating at least one counter of a number of conditional jumps during the program execution.

20. The method of claim 12 wherein replacing the second value based on the first value comprises adding the first value to the second value.

21. The method of claim 20 wherein the second value is stored in a register and replacing the second value based on the first value comprises storing a result of the adding of the first value to the second value in the register.

22. The method of claim 12 wherein the second value is stored in a register and replacing the second value based on the first value comprises overwriting a value stored in the register.

23. The method of claim 12 wherein the third value is a function of an execution flow of the executing program.

24. The method of claim 13 wherein each section of the program corresponding to a conditional jump has a corresponding reference value.

* * * * *